United States Patent
Chiang

(10) Patent No.: US 10,841,281 B2
(45) Date of Patent: Nov. 17, 2020

(54) METHODS FOR PREVENTING OR DETECTING COMPUTER ATTACKS IN A CLOUD-BASED ENVIRONMENT AND APPARATUSES USING THE SAME

(71) Applicant: Kuo Chiang, New Taipei (TW)

(72) Inventor: Kuo Chiang, New Taipei (TW)

( * ) Notice: Subject to any disclaimer, the term of this patent is extended or adjusted under 35 U.S.C. 154(b) by 220 days.

(21) Appl. No.: 15/936,338

(22) Filed: Mar. 26, 2018

(65) Prior Publication Data

US 2019/0297056 A1  Sep. 26, 2019

(51) Int. Cl.
*H04L 29/06* (2006.01)
*G06F 21/53* (2013.01)

(52) U.S. Cl.
CPC ...... *H04L 63/0245* (2013.01); *H04L 63/0281* (2013.01); *H04L 63/1466* (2013.01); *G06F 21/53* (2013.01)

(58) Field of Classification Search
CPC ............. H04L 63/0245; H04L 63/1466; H04L 63/0281; H04L 63/1425; H04L 63/1433; G06F 21/53; G06F 21/554; G06F 21/566
See application file for complete search history.

(56) References Cited

U.S. PATENT DOCUMENTS

| | | | | |
|---|---|---|---|---|
| 8,458,341 | B2* | 6/2013 | Larson | H04L 29/12594 709/227 |
| 9,553,899 | B2* | 1/2017 | Liu | H04L 65/1069 |
| 10,237,875 | B1* | 3/2019 | Romanov | H04L 47/32 |
| 2007/0258438 | A1* | 11/2007 | Bennett | H04L 63/0227 370/352 |
| 2009/0049537 | A1* | 2/2009 | Chen | H04L 29/12433 726/12 |
| 2010/0235632 | A1* | 9/2010 | Iyengar | H04L 9/3213 713/166 |
| 2010/0257598 | A1* | 10/2010 | Demopoulos | G06F 21/552 726/13 |
| 2011/0153827 | A1* | 6/2011 | Yengalasetti | G06F 9/5044 709/226 |
| 2014/0282816 | A1* | 9/2014 | Xie | H04L 63/0227 726/1 |
| 2015/0295823 | A1* | 10/2015 | Li | H04L 45/74 370/392 |
| 2016/0182560 | A1* | 6/2016 | Fleischman | H04L 63/1458 726/23 |
| 2017/0331856 | A1* | 11/2017 | Vissamsetty | H04L 63/1416 |

OTHER PUBLICATIONS

Krugel et al., "Service specific anomaly detection for network intrusion detection", SAC '02: Proceedings of the 2002 ACM symposium on Applied computing Mar. 2002 pp. 201-208 (Year: 2002).*

* cited by examiner

*Primary Examiner* — Morshed Mehedi

(57) ABSTRACT

The invention introduces a method for preventing or detecting computer attacks in a cloud-based environment, performed by a processing unit of an apparatus, which contains at least the following steps. A first IP (Internet Protocol) packet is received from a client system through the Internet. A service request is acquired from the first IP packet, which requests service to a protected computer asset. It is determined whether the service request contains a computer attack. An attack prevention/detection operation is performed to prevent an attack from damaging the protected computer asset when the service request contains a computer attack.

28 Claims, 6 Drawing Sheets

METHODS FOR PREVENTING OR DETECTING COMPUTER ATTACKS IN A CLOUD-BASED ENVIRONMENT AND APPARATUSES USING THE SAME

BACKGROUND

Technical Field

The present invention relates to computer security, and in particular, to methods for preventing or detecting computer attacks in a cloud-based environment and apparatuses using the same.

Description of the Related Art

In a computer security context, hackers can seek and exploit weaknesses in a computer system or computer network. Corporation may suffer from such attacks, which include such risks as damaging computer services, breaching personal data of customers, losing profit or reputation, etc. Computer attacks are often carried out over the Internet. Thus, it is desirable to have methods for preventing or detecting computer attacks in a cloud-based environment and apparatuses using the same to effectively block computer attacks.

BRIEF SUMMARY

An embodiment of the invention introduces a method for preventing or detecting computer attacks in a cloud-based environment, performed by a processing unit of an apparatus, which contains at least the following steps. One or more IP (Internet Protocol) packets are received from a client system through the Internet. A service request is acquired from the IP packet(s), which requests service to a protected computer asset. It is determined whether the service request comprises a computer attack. An attack prevention/detection operation is performed to prevent an attack from damaging the protected computer asset when the service request comprises a computer attack.

An embodiment of the invention introduces an apparatus for preventing or detecting computer attacks in a cloud-based environment, which contains at least a communications interface and a processing unit. The processing unit, coupled to the communications interface, receives one or more IP packets from a client system through the Internet via the communications interface; acquires a service request from the IP packet(s), which requests service to a protected computer asset; determines whether the service request comprises a computer attack; and performs an attack prevention/detection operation from damaging the protected computer asset when the service request comprises the computer attack.

A detailed description is given in the following embodiments with reference to the accompanying drawings.

BRIEF DESCRIPTION OF THE DRAWINGS

The present invention can be fully understood by reading the subsequent detailed description and examples with references made to the accompanying drawings, wherein.

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Figure 1:
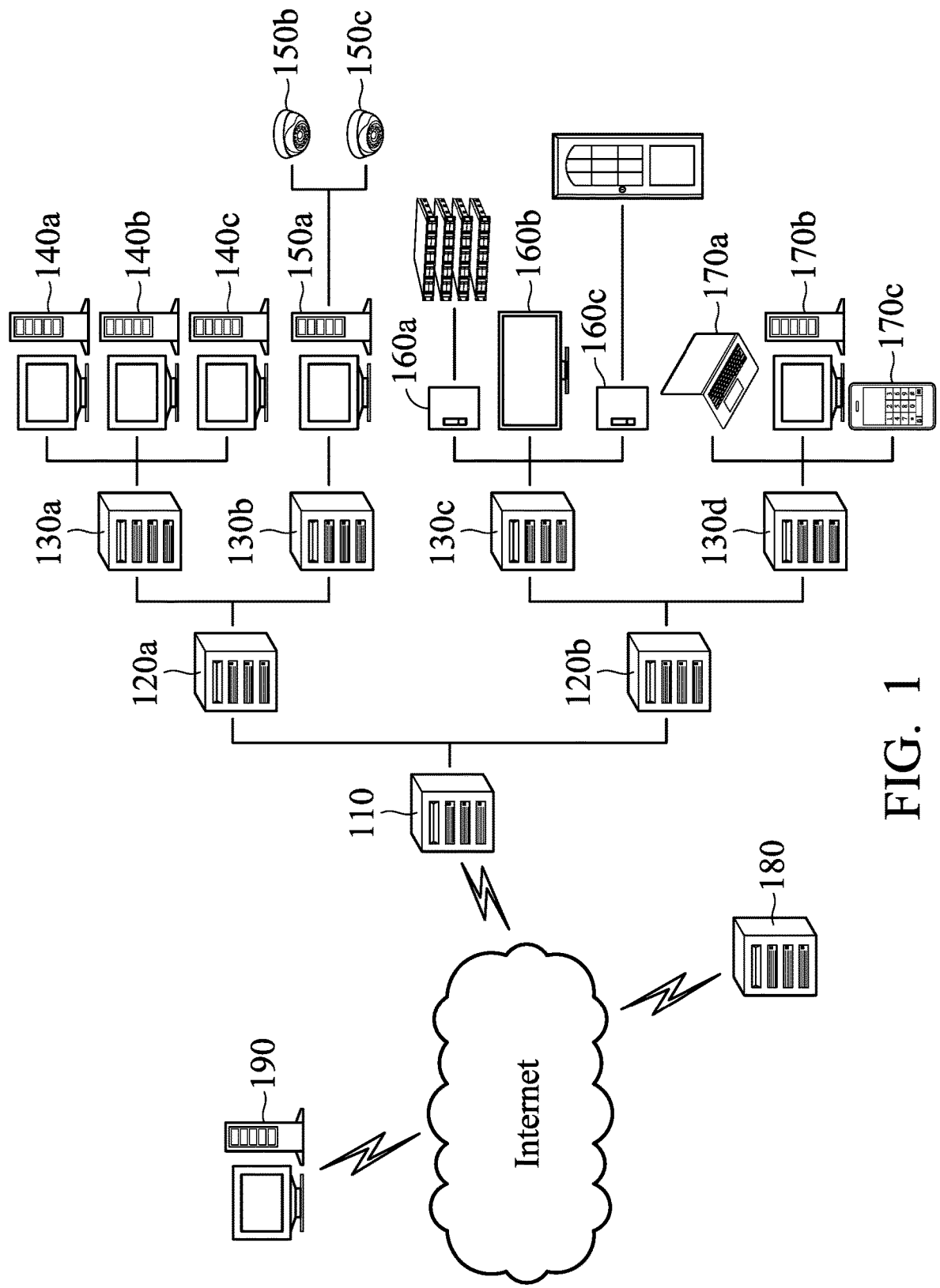
FIG. 1 is a schematic diagram of the network architecture according to an embodiment of the invention.

An embodiment of the invention introduces the network architecture for connecting a wide range of protected computer assets, such as computers, computer servers, monitoring systems, IoT (Internet of Things) devices. FIG. 1 is a schematic diagram of the network architecture according to an embodiment of the invention. Protected computer assets include servers 140*a* to 140*c*, the monitoring system inclusive of the monitor host 150*a* with surveillance cameras 150*b* and 150*c*, the IoT devices, such as the bulb control system 160*a*, the smart TV (television) 160*b*, the lock control system 160*c*, etc., and client computers, such as the notebook computer 170*a*, the personal computer 170*b*, the tablet computer 170*c*, etc. The server 140*a*, 140*b* or 140*c* may be a web server, an application server, an email server, an IM (Instant Messaging) server, a NAS (Network-attached storage) server, or others. The web server may store, generate and deliver web pages to clients. The communication between a client and the web server takes place using the HTTP (Hypertext Transfer Protocol) or other protocols. Web pages delivered are most frequently HTML (Hyper-Text Markup Language) documents, which may include images, style sheets and scripts in addition to text content. The application server may be a software framework that provides both facilities to create web applications and a server environment to run the web applications. The application server framework may contain a comprehensive service layer model. The application server may operate as a set of components accessible to the software developer through an API (Application Programming Interface) defined by the platform itself. For Web applications, the components may be performed in the same running environment as its web server, and their main task is to support the construction of web pages. The components may implement services like clustering, fail-over, and load-balancing, such that software developers can focus on implementing the business logic. The email server may receive an email from a mail client using SMTP (Simple Mail Transfer Protocol) for relaying and delivering an email to the mail client using either POP3 (Post Office Protocol version 3) or IMAP (Internet Message Access Protocol). The IM server may facilitate communication among one or more participants, allowing the immediate receipt of an acknowledgment or reply. The NAS server may provide data access to a heterogeneous group of clients, which contains one or more hard drives arranged into logical, redundant storage containers or RAID (Redundant Array of Independent Disks). Surveillance cameras 150b and 150c may be video cameras used to observe an area and the monitoring host 150a may include a recording device for recording and compressing the images captured by the surveillance cameras 150b and 150c and storing the compact videos in a searchable database. The IoT devices 160a to 160c may be physical devices embedded with electronics, software, sensors, and connectivity to enable the devices to exchange data with the other connected devices. The IoT devices may allow devices to be sensed and controlled remotely across the network infrastructure. A client system 190 connected to the Internet may send requests requesting service to any of the protected computer assets 140a to 170c. The above list is not exhaustive, and it should be understood that other servers, IoT devices or computer systems can be protected.

Each of the protected computer assets 140a to 170c is connected to one of the hubs 130a to 130d. Each hub is a device for connecting multiple Ethernet devices together and making them operate like a single network segment. The hub has multiple I/O (Input/Output) ports, in which a signal introduced at the input of any port appears at the output of every port except the original incoming. Any of the hubs 130a to 130d may alternatively be replaced with an AP (Access Point). The AP allows the protected computer assets 140a to 170c to connect to a wired network using Wi-Fi, or related standards. Each of the routers 120a to 120b forwards network packets between computer networks. A network packet is typically forwarded from one router to another through the networks that constitute the internetwork until it reaches its destination node. The router is connected to two or more data lines from different networks. When a network packet comes in on one of the lines, the router reads the address information in the packet to determine its ultimate destination. Then, using information in its routing table or routing policy, the router directs the network packet to the next network. The routers 120a to 120b may be home or small office routers that simply pass data, such as web pages, email, IM (Instant Messages), audio streams, video streams, etc., between the protected computer assets 140a to 170c and the Internet. The home or small office router may be the cable or DSL (Digital Subscriber Line) router, which connects to the Internet through an ISP (Internet service provider). Any of the routers 120a to 120b may alternatively be an enterprise router to connect large business or ISP networks up to the powerful core routers that forward data at high speed along the optical fiber lines of the Internet backbone. The gateway 110 may operate as a proxy server and a firewall server. The gateway 110 may integrate the functionalities of both a router, which knows where to direct a given network packet that arrives at the gateway 110, and a switch, which furnishes the actual path in and out of the gateway 110 for a given packet.

The attack prevention/detection server 180 is situated on the Internet to prevent computer attacks from damaging the protected computer assets 140a to 170c. The IP addresses of the protected computer assets 140a to 170c are not announced to the public and are stored in the attack prevention/detection server 180. That is, a hacker may not know the actual IP addresses of the protected computer assets 140a to 170c. Requests requesting the protected computer assets 140a to 170c for a wide range of services are first directed to the attack prevention/detection server 180 and examined. The attack prevention server 180 operates like a virtual gate of the protected computer assets 140a to 170c in a cloud-based environment. The protected computer assets 140a to 170c are located behind the attack prevention/detection server 180 virtually. Only attack-free requests can be forwarded by the attack prevention/detection server 180 to relevant protected computer assets 140a to 170c. The IP address of the attack prevention/detection server 180 may be announced to the public to pretend to be the IP address of any of the protected computer assets 140a to 170c. There may be several ways to make the announcement. An administrator of any of the protected computer assets 140a to 170c may register a domain name mapping to the IP address of the attack prevention/detection server 180 through the DNS (Domain Name System) server. It should be understood by those skilled in the art that any name registered in the DNS is a domain name. The domain name is formed by the rules and procedures of the DNS. The domain name may be used in a networking context and application-specific naming and addressing purpose. For example, the domain name represents an IP (Internet Protocol) resource, such as a server computer hosting a web site, or the web site itself or any other service communicated via the Internet. The DNS server replies with the IP address of the attack prevention/detection server 180 to any client querying an IP address of the domain name. An administrator of any of the protected computer assets 140a to 170c may publish the IP address of the attack prevention/detection server 180 to the public to pretend to be the IP address of the protected computer asset on a Web page or other human-readable medium. The client system 190 issues service requests with the IP address of the attack prevention/detection server 180 to request a wide range of services and the packets carrying the requests flow to the attack prevention/detection server 180.

Figure 2:
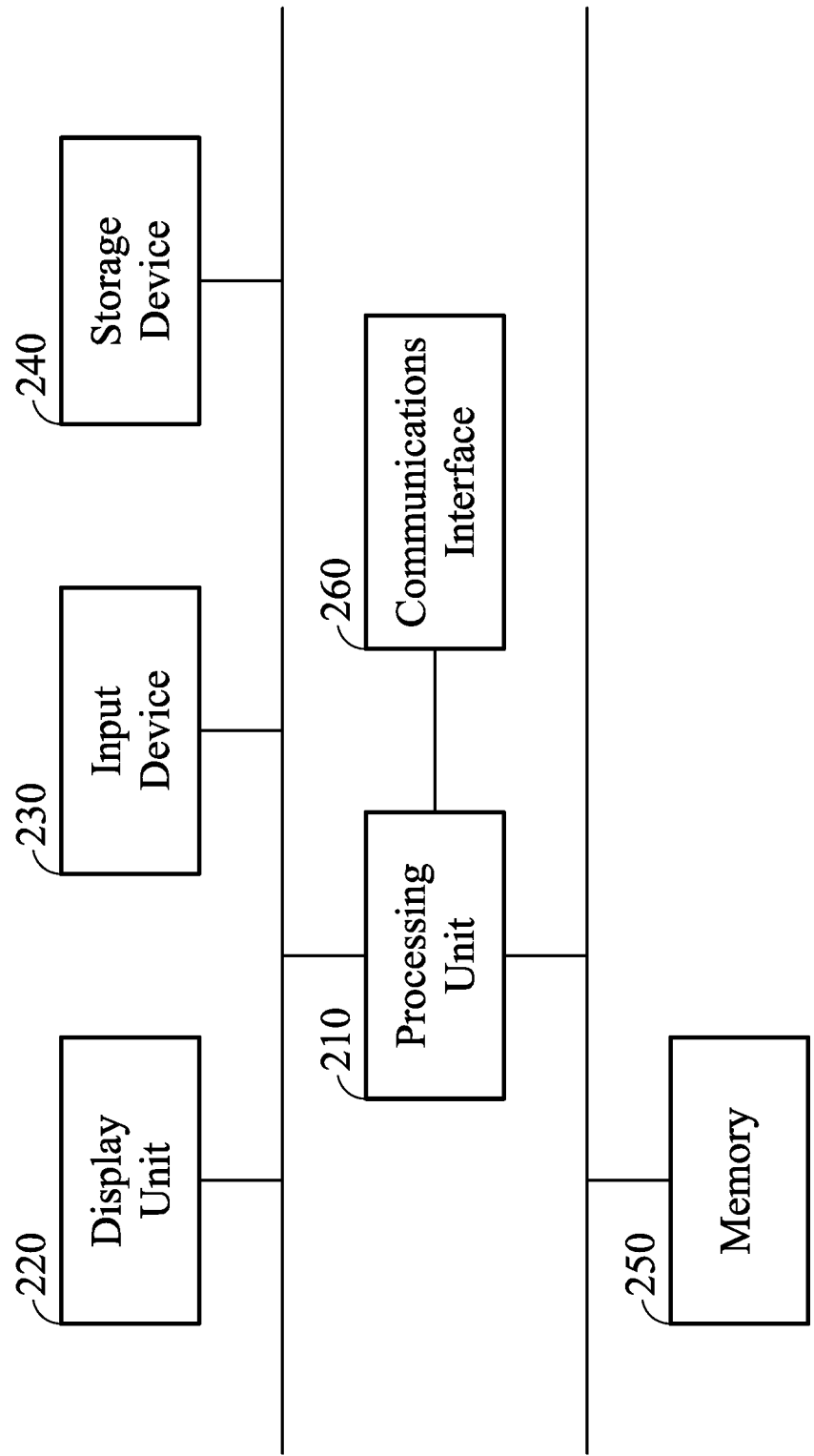
FIG. 2 is the system architecture of an attack prevention/detection server according to an embodiment of the invention.

FIG. 2 is the system architecture of an attack prevention/detection server according to an embodiment of the invention. The processing unit 210 can be implemented in numerous ways, such as with dedicated hardware, or with general-purpose hardware (e.g., a single processor, multiple processors or graphics processing units capable of parallel computations, or others) that is programmed using microcode or software instructions to perform the functions recited herein. The system architecture further includes a memory 250 for storing necessary data in execution, such as variables, data tables, data abstracts, or others, and a storage unit 240 for storing a white list, a black list, a wide range of filtering rules, and others. A communications interface 260 is included in the system architecture and the processing unit 210 can thereby communicate with other electronic apparatuses. The communications interface 260 may be a LAN (Local Area Network) module, a WLAN (Wireless Local Area Network) module, or others with the communications capability. The system architecture further includes one or more input devices 230 to receive user input, such as a keyboard, a mouse, a touch panel, or others. A user may press hard keys on the keyboard to input characters, control a mouse pointer on a display by operating the mouse, or control an executed application with one or more gestures made on the touch panel. The gestures include, but are not limited to, a single-click, a double-click, a single-finger drag, and a multiple finger drag. A display unit 220, such as a TFT-LCD (Thin film transistor liquid-crystal display) panel, an OLED (Organic Light-Emitting Diode) panel, or another display unit, may also be included to display input letters, alphanumeric characters and symbols, dragged paths, drawings, or screens provided by an application for a user to view.

Figure 3:
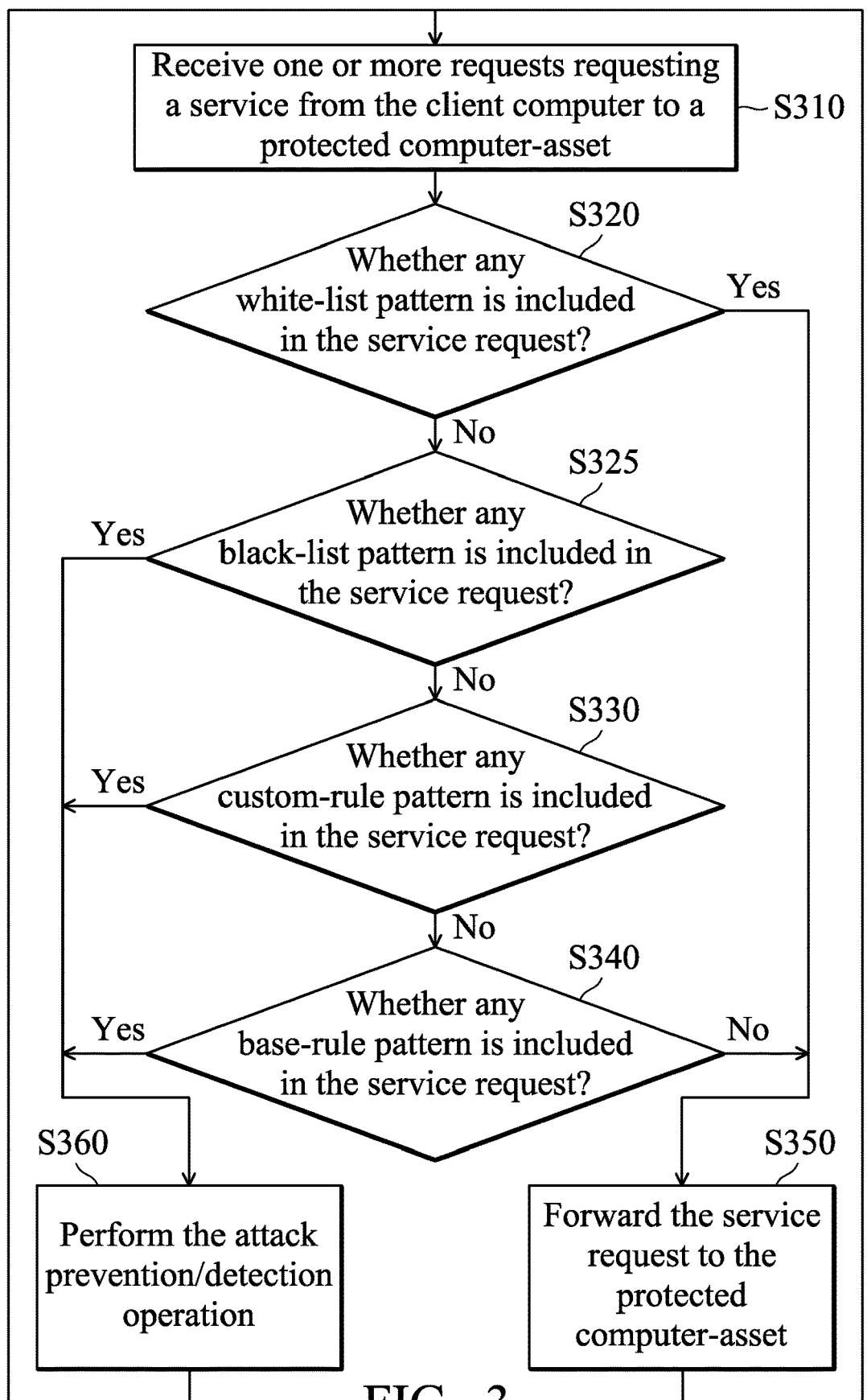
FIG. 3 is a flowchart illustrating a two-phase filtering method according to an embodiment of the invention.
Figure 4:
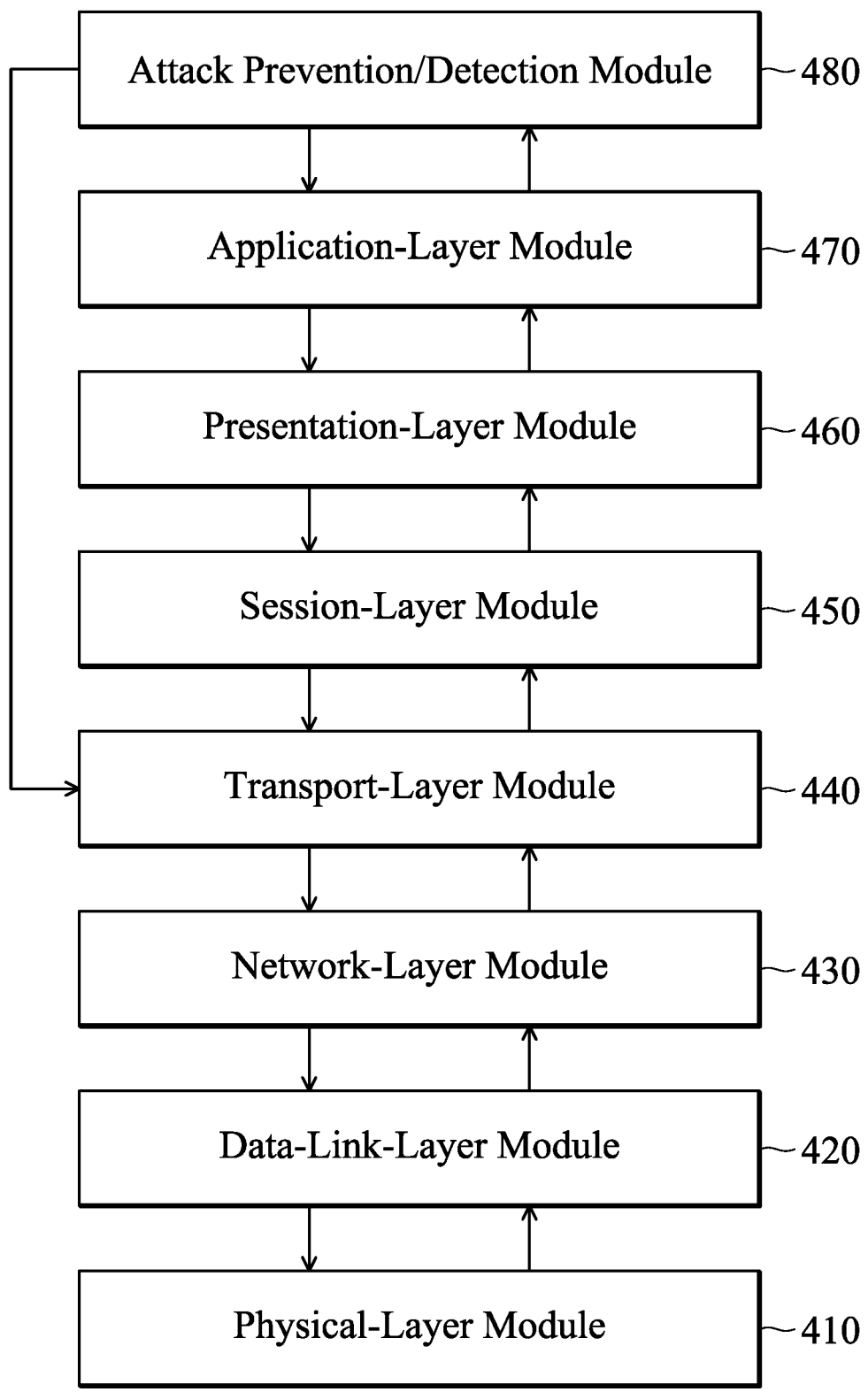
FIG. 4 is a schematic diagram of software modules, being loaded and executed by a processing unit, for dealing with network packets flowing through the attack prevention/detection server according to an embodiment of the invention.

To prevent computer attacks from damaging the protected computer assets 140a to 170c, an embodiment of a two-phase filtering method is introduced to examine network packets including various service requests, which are routed to the attack prevention/detection server 180, in the efficient manner and perform an attack prevention/detection operation once detecting that any network packet includes an attack pattern. The method is performed by the attack prevention/detection server 180 when the processing unit 210 thereof loads and executes relevant software code or instructions with predefined patterns. FIG. 3 is a flowchart illustrating a two-phase filtering method according to an embodiment of the invention. The method may examine layer 7 (so-called application layer) messages encapsulated in the flowing network packets to detect attack patterns. Each service request may include a destination address, a destination port number, request messages, executable scripts, form objects, post actions, executable program-uploads, or any combinations thereof. FIG. 4 is a schematic diagram of modules for dealing with network packets that flow through the attack prevention/detection server 180 according to an embodiment of the invention. The software modules 410 to 470 may follow the specification of the OSI model (Open Systems Interconnection model) to extract data or messages layer by layer. The OSI model characterizes and standardizes the communications of a telecommunication or computing system without regard of their underlying internal structure and technology. The physical-layer module 410, the data-link-layer module 420, the network-layer module 430 and the transport-layer module 440 may be practiced in the communications interface 260. The physical-layer module 410 may establish and terminate a connection between two directly connected nodes over a communications medium. The electrical and physical specifications of the data connection may include the layout of pins, voltages, line impedance, cable specifications, signal timing or more. The data-link-layer module 420 may provide node-to-node data transfer, a reliable link between two directly connected nodes, by detecting and possibly correcting errors that may occur in the physical layer. The data link layer may be divided into two sublayers: a MAC (Media Access Control) layer, which is responsible for controlling how devices in a network gain access to data and permission to transmit it; and an LLC (Logical Link Control) layer, which controls error checking and packet synchronization. The network-layer module 430 may provide the functional and procedural means of transferring variable length data sequences (called datagrams) from one node to another. The network-layer module 430 may translate logical network addresses into physical machine addresses. Every node has an address, which permits one node connected to the network to transfer messages to other nodes connected to the network by merely providing the content of a message and the address of the destination node and letting a gateway or a router find the way to deliver ("route") the message to the destination node. In addition to message routing, the network-layer module 430 may implement message delivery by splitting the message into several fragments, delivering each fragment by a separate route and reassembling the fragments, report delivery errors, etc. The transport-layer module 440 may control the reliability of a given link through flow control, segmentation/de-segmentation, and error control. The transport-layer module 440 may keep track of the segments and retransmit those that fail. The transport-layer module 440 may also provide the acknowledgement of the successful data transmission and send the next data if no errors occur. The transport-layer module 440 may create packets out of the message received from the application-layer module 470. The transport-layer protocol employed in the transport-layer module 440 may be TCP (Transmission Control Protocol), usually built on top of IP. The session-layer module 450, the presentation-layer 460 and the application-layer module 470 may be practiced in software code or instructions, which are loaded and executed by the processing unit 210. The session-layer module 450 may establish, manage and terminate the connections between the local and remote application. The presentation-layer module 460 may establish context between application-layer entities, in which the application-layer entities may use different syntax and semantics if the presentation service provides a mapping between them. If a mapping is available, presentation service data units are encapsulated into session protocol data units, and passed down the protocol stack. The application-layer module 470 may provide independence from data representation (e.g., encryption) by translating between application and network formats. The application-layer module 470 may transform data into the form that the application accepts. For example, the application-layer module 470 may extract or translate request messages (so-called layer 7 messages), such as HTTP, HTTPS (Secure Hypertext Transfer Protocol), WAP (Wireless Application Protocol), FTP (File Transfer Protocol), LDAP (Lightweight Directory Access Protocol), SSH (Secure Shell) requests, etc., from or into IP packets. The method continuously receives one or more requests requesting service from the client system 190 via the communications interface 260 (step S310). The filtering method illustrated in FIG. 3 may be implemented in the attack prevention/detection module 480. In step S310, the attack prevention/detection module 480 may receive the service requests from the application-layer module 470.

Following the receipt of the service requests (step S310), two-phase filtering is performed. In phase-one, at least one of three judgments is included. The first one determines whether any white-list pattern is included in each service request (step S320). The white-list patterns added or updated by a user may be regular expressions or other expression languages. The white-list patterns are read from the storage device 240 and provided to facilitate the speed of making decisions and avoid false positives. That is, the processing unit 210 simply bypasses service requests having white-list patterns, without detecting anything further. The second one determines whether any black-list pattern is included in each service request (step S325). The black-list patterns added or updated by a user may include a specific source IP address, or others. The black-list pattern are read from the storage device 240 and provided to facilitate the speed of making decisions. That is, the processing unit 210 directly performs an attack prevention/detection operation. The third one determines whether any custom-rule pattern is included in each service request (step S330). The custom-rule patterns are stored in the storage device 240 and are added, modified or reinforced with particular types of protected computer assets, such as the web server, the application server, the IM server, the NAS server, the email server, the monitoring system, the IoT device, the client computer, etc. The custom-rule patterns may be considered as enhanced patterns for particular types of protected computer assets. For example, if the corporation mainly protects web servers from being damaged, custom-rule patterns related to the web servers are provided to filter out possible attacks to the web servers. Once discovering the white-list pattern (the "Yes" path of step S320), the processing unit 210 executing the attack prevention/detection module 480 forwards the service request to the protected computer asset (step S350). Specifically, the transport-layer module 440 may cache the network packets corresponding to each service request, such as TCP/IP packets with a destination IP address, in the memory 250 (step S310), and, after discovering the white-list pattern (the "Yes" path of step S320), the attack prevention/detection module 480 may direct the transport-layer module 440 to transmit the cached network packets down to the protocol stack, thereby enabling the service request enclosed in the network packets to be forwarded to the protected computer asset, without re-generating network packets using the presentation-layer module 460 and the session-layer module 450 (step S350). Alternatively, the attack prevention/detection module 480 may transmit the service request down to the presentation-layer module 460 directly, thereby enabling the service request to be forwarded to the protected computer asset (step S350). Once discovering no white-list pattern (the "No" path of step S320) but the black-list pattern (the "Yes" path of step S325), the processing unit 210 executing the attack prevention/detection module 480 performs the attack prevention/detection operation (step S360). Once discovering none of the white-list pattern and the black-list pattern (the "No" path of step S325 following the "No" path of step S320) but the custom-rule pattern (the "Yes" path of step S330), the processing unit 210 executing the attack prevention/detection module 480 performs the attack prevention/detection operation (step S360). The custom-rule patterns are specifically designed for protected systems or existing vulnerability. In an example, the custom-rule pattern contains a string "a=2147483647", which may trigger specific application errors, and the processing unit 210 performs the attack prevention/detection operation after detecting that the string is included in the request message "HTTP-GET: http://www.example.com/index.php?a=2147483647" of the service request. In still another example, the custom-rule pattern contains a permitted quantity of login attempts in the predetermined time period, and the processing unit 210 performs the attack prevention/detection operation after detecting that the number of attempts the client system 190 made to log in the protected computer asset in the predetermined time period exceeds the permitted quantity. In still another example, the custom-rule pattern decodes and checks messages encoded by base64, and the processing unit 210 performs the attack prevention/detection operation by detecting that the decoded service request includes malicious contents. In still another example, the custom-rule pattern contains patterns to protect a specific IoT device, which is deployed and its vulnerability is identified. Although the three judgements appear to occur in a specific order, those skilled in the art may devise the order depend on design requirements and the invention should not be limited thereto.

Once discovering no white-list pattern (the "No" path of step S320), no black-list pattern (the "No" path of step S325) and no custom-rule pattern (the "No" path of step S330), the second phase filtering is performed. In phase-two, the processing unit 210 determines whether any base-rule pattern is included in each service request (step S340). The base-rule patterns are stored in the storage device 240 and provided to prevent common and critical attacks from damaging the protected computer assets. The base-rule patterns are not specifically designed for individual systems or vulnerabilities. The base-rule patterns are used to prevent common attacks. The base-rule patterns may be updated periodically, such as daily, weekly, etc., to respond to the newly detected attack behaviors. The processing unit 210 executing the attack prevention/detection module 480 forwards the service request to the protected computer asset (step S350) when no base-rule pattern is discovered in the service request (the "No" path of step S340). In step S350, as discussed above, the attack prevention/detection module 480 may forward the service request to the protected computer asset by directing the transport-layer module 440 to transmit the cached network packets down to the protocol stack or transmitting the service request down to the presentation-layer module 460 directly. The processing unit 210 executing the attack prevention/detection module 480 performs the attack prevention/detection operation (step S360) when the base-rule pattern is discovered in the service request (the "Yes" path of step S340). In an example, the base-rule pattern contains a string ""or 1=1--" and the processing unit 210 performs the attack prevention/detection operation after detecting that the string is included in the executable scripts of the service request. In another example, the base-rule pattern contains a string ""><script>alert('0');</script>" and the processing unit 210 performs the attack prevention/detection operation after detecting that the string is included in the request message of the service request. In still another example, the base-rule pattern contains the permitted quantity of characters of the request message of the service request and the processing unit 210 performs the attack prevention/detection operation after detecting that the length of the request message exceeds the permitted quantity, as it may be buffer-overflow attacks. In an embodiment of the attack prevention/detection operation, special characters of the request message of the service request, by which a trigger of the execution of malicious attack scripts is bracketed, are replaced with equivalent strings, for example, special characters "<" and ">" may be replaced with "<" and ">" respectively and the modified request message is forwarded to the protected computer asset. Those skilled in the art will understand that no execution of malicious scripts can be triggered when the trigger is bracketed by strings "<" and ">". That is, the special characters are replaced to prevent the strings from switching into any execution context. In another embodiment, service requests containing the detected custom-rule patterns or base-rule patterns are dropped, without forwarding them to the protected computer assets. In still another embodiment, service requests containing the detected custom-rule patterns or base-rule patterns are blocked from being forwarded to the protected computer asset and messages are responded to the client system 190. The message may be "HTTP 500—Internal Server Error", "HTTP 403—Forbidden", "HTTP 200—OK", or others. In still another embodiment, service requests containing the detected custom-rule patterns or base-rule patterns are forwarded to the protected computer asset and logs describing the detection times with the discovered custom-rule patterns or base-rule patterns and other relevant information are recorded. In still another embodiment, an url (uniform resource locator) linking to a warning web page is responded to the client system 190, thereby enabling users to browse the warning web page. The warning web page may show a warning of the illegal or un-safe access. In still another embodiment, service requests containing the detected custom-rule patterns or base-rule patterns are forwarded to a destination site of a sandbox, in which the damage can be controlled to remain within a limited scope. It should be understood that the attack prevention/detection module 480 may examine request messages, executable scripts, form objects, post actions, executable program-uploads, or others of the service requests to determine whether any white-list pattern, custom-rule pattern or base-rule pattern is included therein as described in the aforementioned step S320, S330 or S340. The white-list and black-list patterns, the custom-rule patterns and the base-rule patterns are stored in the storage device 240 or loaded into the memory 250.

The introduced method can be applied to reduce the damage caused by SQL (Structured Query Language) injection attacks, XSS (Cross-Site Scripting) attacks, path traversal attacks, command injection attacks, buffer overflow attacks, CSRF (Cross-Site Request Forgery) attacks, or others. A SQL injection attack consists of insertion of a SQL query. A successful SQL injection exploit may read sensitive data from the database, modify database data, such as Insert, Update or Delete, execute administration operations on the database, such as shutdown the DBMS (Database Management System), recover the content of a given file present on the DBMS file system and in some cases issue commands to the operating system. XSS attacks may inject malicious scripts into trusted web servers, so-called persistent XSS attacks. XSS attacks may occur when an attacker uses a web application to send malicious code, generally in the form of a browser side script, to a different end user, so-called reflected XSS attacks. A path traversal attack attempts to access files and directories that are stored outside the web root folder. By visiting the directories, the attacker looks for absolute links to files stored in the web server, the application, the email server, the IM server, the NAS server, or others. By manipulating variables that reference files with "dot-dot-slash (../)" sequences and its variations, it may access arbitrary files and directories stored in the file system, including application source code, configuration and critical system files, limited by system operational access control. The attacker may use "../" sequences to move up to the root directory, thus permitting navigation through the file system. The sequences for traversing directories may be carried in the service request, for example, "http://www.test.com/../../../". A command injection attack executes arbitrary commands on the host OS (operating system) via a vulnerable application. Command injection attacks are possible when an application passes unsafe user supplied data (forms, cookies, HTTP headers etc.) to a system shell. A buffer overflow attack uses buffer overflows to corrupt the execution stack of a web server or an application server. By sending carefully crafted input to a web application, an attacker can cause the web application to execute arbitrary code to cause buffer overflows. A CSRF attack forces the user to execute unwanted actions on a web application in which they are currently authenticated. With the help of a social application (such as sending a link via email or chat), an attacker may trick the user of a web application into executing actions of the attacker's choosing. If the victim is a normal user, a successful CSRF attack may force the user to perform state changing requests like transferring funds, changing their email address or password, and so on. If the victim is an administrative account, CSRF may compromise the entire web application.

As reflected to the aforementioned phase-two filtering, the base-rule patterns cover as many attack behaviors of all kinds as possible. In other words, the base-rule patterns cover more types of protected computer assets than the custom-rule patterns. Moreover, the base-rule patterns may prevent some types of vulnerability, which does not present in the corporation network. The rules are not specifically designed for an individual system. For example, the corporation network has no IoT devices and the base-rule patterns contain patterns that can provide general attack prevention for IoT devices. It should be noted that the corporation network might have IoT devices in the future and it is necessary to have base-rule patterns to prevent the computer attacks against IoT devices. However, it may take a lot of time to pass the inspection associated with the base-rule patterns by thoroughly examining the content of service requests. The phase-one filtering inclusive of the white-list pattern and custom-rule patterns inspections is provided prior to the phase-two filtering. The custom-rule patterns are served for limited kinds of protected computer assets, which are resident behind the gateway 110 or the router 120a or 120b. The custom rules are designed specifically for computer assets or software vulnerabilities in place. They may be different according to the protected systems. On one hand, the service requests are forwarded to the destination instantly once any white-list pattern is discovered, without inspecting anything further. There may be also a black-list pattern, which blocks attackers at early stage, for example, based on IP addresses. On the other hand, the attack prevention/detection operation is performed instantly after any custom-rule pattern is discovered.

Although the embodiments describe that the custom-rule patterns are used in the phase-one filtering and the base-rule patterns are used in the phase-two filtering, those skilled in the art may swap the applied patterns. In other words, steps S330 and S340 can be swapped depending on different requirements. For example, when the corporation network faces more common attacks than attacks against specific protected computer assets, systems or vulnerability, the base-rule patterns are applied in the phase-one filtering while the custom-rule patterns are applied in the phase-two filtering.

Figure 5:
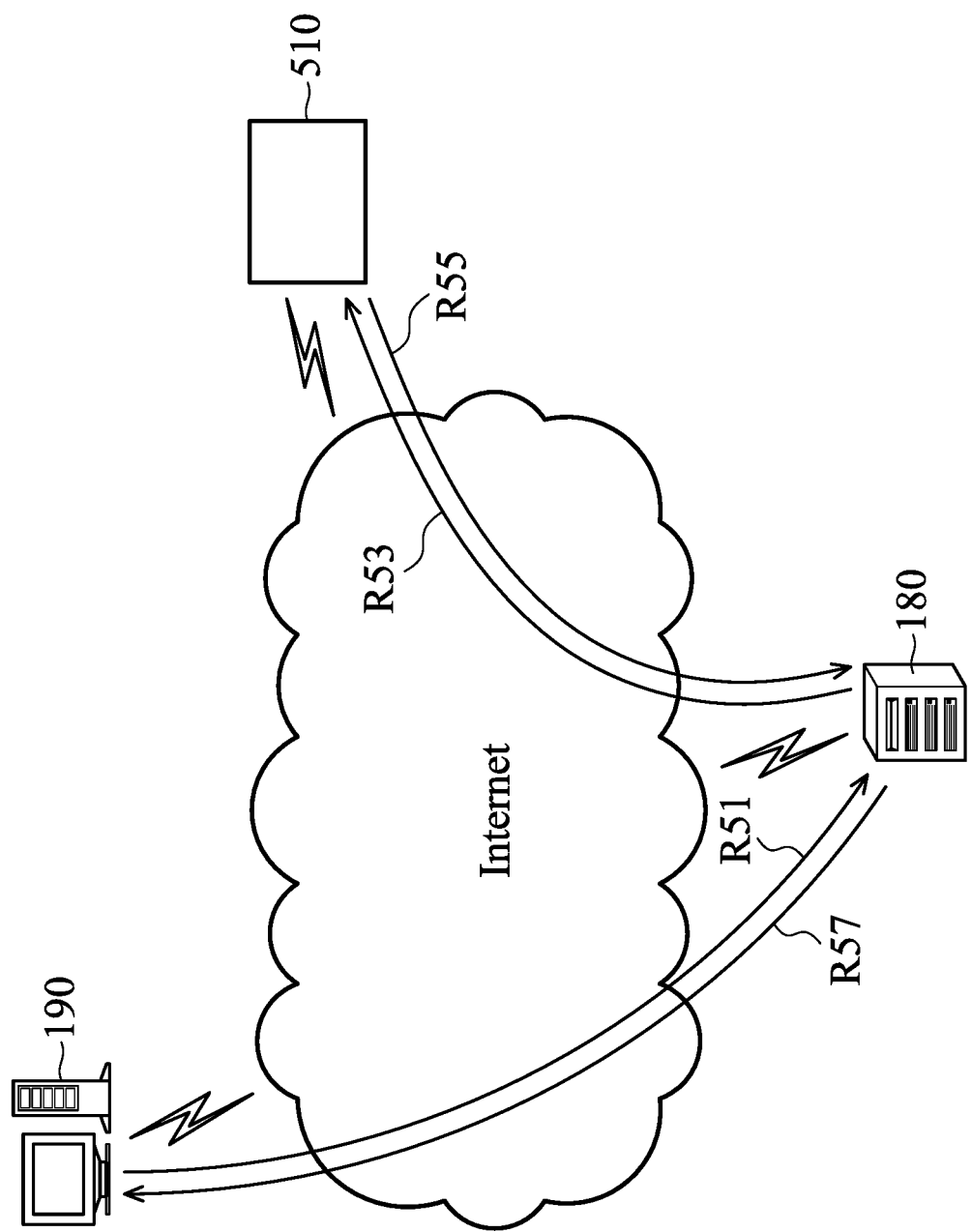
FIG. 5 is a schematic diagram illustrating transportation of service requests and responses between a client system and a protected computer asset according to an embodiment of the invention.

The attack prevention/detection server 180 not only identifies computer attacks from the service requests, but also plays a role for transporting attack-free service requests to a protected computer asset and transporting responses from the protected computer asset to the requesting client system. FIG. 5 is a schematic diagram illustrating transportation of service requests and responses between a client system and a protected computer asset according to an embodiment of the invention. The client system 190 transmits one or more IP packet(s) R51 carrying service requests to the attack prevention/detection server 180. Any service request will have undergone the determination steps S320, S325, S330 and S340. When the service request is decided to forward to the protected computer asset 510, such as any of the protected computer assets 140a to 170c (step S350), the processing unit 210 generates and transmits one or more IP packet(s) R53 carrying the service request to the protected computer asset 510. The source address of each IP packet R53 is the IP address of the attack prevention/detection server 180 and the destination address of each IP packet R53 is the IP address of the protected computer asset 510. Moreover, the IP address of the client system 190 is enclosed in a packet header or payload of each IP packet R53, so as to make the protected computer asset 510 know where the actual source issuing the service request is. It should be noted that the expression of the service request may not be changed as described in step S350, or it may be changed as described in step S360. The protected computer asset 510 performs relevant operations in response to the service request and replies with a response carried by one or more IP packet(s) R55 to the attack prevention/detection server 180. The source address of each IP packet R55 is the IP address of the protected computer asset 510 and the destination address of the IP packet R55 is the IP address of the attack prevention/detection server 180. Moreover, the IP address of the client system 190 is enclosed in a packet header or payload of each responding IP packet R55, so as to let the attack prevention/detection server 180 to know where the actual destination of the response is. The processing unit 210 accordingly generates and transmits one or more IP packets R57 carrying the response to the client system 190. The source address of each IP packet R57 is the IP address of the attack prevention/detection server 180 and the destination address of each IP packet R57 is the IP address of the client system 190. The processing unit 210 may generate each IP packet R57 derived from each IP packet R55. Specifically, the processing unit 210 generates an IP packet R57 by removing the IP address of the client system 190 from a packet header or payload of each IP packet R55, replacing the source address of the IP packets R55 with the IP address of the attack prevention/detection server 180 and replacing the destination address of the IP packet R55 with the IP address of the client system 190. Therefore, the protected computer asset 510 is hidden from the perspective of the client system 190.

The attack prevention/detection server 180 may be configured as a virtual gate of one protected computer asset. The IP address of the protected computer asset is stored in the storage device 240 for reference. Specifically, in step S350, the processing unit 210 generates and transmits IP packets with the stored IP address as the destination IP address, which carries service requests issued by the client system 190, to the protected computer asset. The attack prevention/detection server 180 may provide a MIMI (Man-Machine Interface) for an administrator to select a protocol from candidates, such as HTTP, HTTPS, WAP, FTP, LDAP, SSH and the like, employed between the attack prevention/detection server 180 and the protected computer asset. Therefore, the attack prevention/detection server 180 follows the specifications of the protocol to transmit and receive service requests to and from the protected computer asset.

The attack prevention/detection server 180 may be configured as virtual gates of two or more protected computer assets. The storage device 240 may store request types mapping to IP addresses of the protected computer assets. The mappings may be practiced in a data structure, such as a data table, a two-dimensional array, or others, which is accessed through a file system, a relational database system, a document database system, or others. The request types may be indicated by port numbers. Each service request may be determined to forward to a protected computer asset according to the destination port number of an IP packet carrying the service request. Exemplary port numbers mapping to IP addresses of the protected computer assets may be seen in Table 1.

TABLE 1

| Port numbers | IP addresses of protected computer asset | URI |
| --- | --- | --- |
| 80 | 192.168.10.10 | Bank.com |
| 443 | 192.168.10.10 | Bank.com |
| 109 | 192.168.10.20 | Mail1.com |
| 110 | 192.168.10.30 | Mail2.com |
| 995 | 192.168.10.30 | Mail2.com |
| 156 | 192.168.10.40 | DB.com |

Specifically, in step S350, the processing unit 210 searches Table 1 to find an actual IP address of a protected computer asset according to the destination port number of each IP packet carrying a service request, which is sent by the client system 190. Subsequently, the processing unit 210 generates and transmits an IP packet with the found IP address as the destination IP address, which carries the service request, to the protected computer asset. Instead, those skilled in the art may search Table 1 according to the source port number of each IP packet sent by the client system 190.

In some embodiments, the request types may be indicated by source IP addresses. Each service request may be determined to forward to which protected computer asset according to a source IP address of an IP packet carrying the service request. Exemplary source IP addresses mapping to IP addresses of the protected computer assets may be seen in Table 2.

TABLE 2

| Source IP addresses | IP addresses of protected computer asset | URI |
| --- | --- | --- |
| 140.92.0.0~140.92.255.255 | 192.168.10.20 | Mail1.com |
| 192.192.0.0~192.192.255.255 | 192.168.10.30 | Mail2.com |
| 140.57.0.0~140.57.255.255 | 192.168.10.40 | Mail3.com |

Specifically, in step S350, the processing unit 210 searches Table 2 to find an actual IP address of a protected computer asset according to the source IP address of each IP packet carrying a service request, which is sent by the client system 190. Subsequently, the processing unit 210 generates and transmits an IP packet with the found IP address as the destination IP address, which carries the service request, to the protected computer asset. Instead, those skilled in the art may devise the source IP addresses of Table 2 with subnets.

The attack prevention/detection server 180 may provide a MMI for an administrator to configure the mappings as shown in Table 1 or 2.

Figure 6:
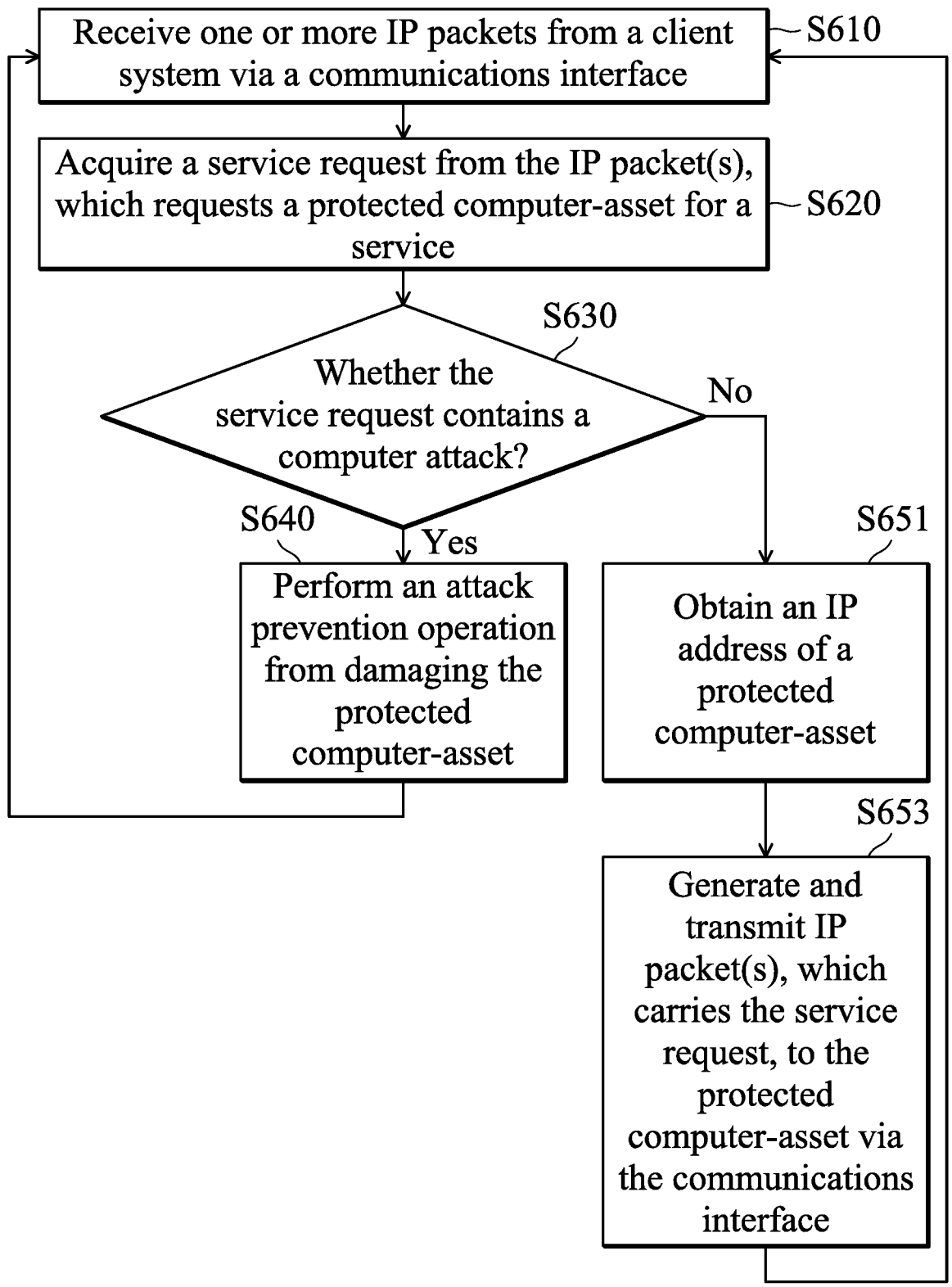
FIG. 6 is a flowchart illustrating a method for preventing or detecting computer attacks in a cloud-based environment according to an embodiment of the invention.

FIG. 6 is a flowchart illustrating a method for preventing or detecting computer attacks in a cloud-based environment according to an embodiment of the invention. The method may examine layer 7 (so-called application layer) messages encapsulated in the flowing network packets to detect the attack patterns. The method illustrated in FIG. 6 may be implemented in the attack prevention/detection module 480. The processing unit 210 of the attack prevention/detection server 180 repeatedly performs a loop to investigate each service request encapsulated in one or more IP packet(s) sent by the client system 190. The process begins with the receipt of one or more IP packets from the client system 190 via the communications interface 260 (step S610) and the acquisition of a service request from the IP packet(s), which requests a service to a protected computer asset (step S620). It is determined whether the service request contains a computer attack (step S630). The determination of the computer attack may be achieved by at least step S340 of the two-phase filtering method as shown in FIG. 3. The determination of the computer attack may further contain step S320, S325 or S330, as shown in FIG. 3, or any combinations thereof. When the service request contains a computer attack (the "Yes" path of step S630), an attack prevention/detection operation is performed to prevent the attack from damaging the protected computer asset (step S640). For details of step S640, the reader may refer to the descriptions of step S360, which are omitted for brevity. When the service request contains no computer attack (the "No" path of step S630), the processing unit 210 obtains the IP address of a protected computer asset (step S651), and generates and transmits IP packet(s), which carries the service request, to the protected computer asset via the communications interface 260 (step S653). In step S651, the IP address of the protected computer asset may be read from the storage device 240. Alternatively, the IP address of the protected computer asset may be obtained by searching the mappings of Table 1 or 2 according to a request type of the IP packet(s). The request type may be indicated by a destination port number, a source port number or a source IP address of the IP packet(s), or others. In step S653, the IP address of the client system 190 may be provided in packet header(s) or payload(s) of the generated IP packet(s) and the service request sent by the client system 190 is provided in the payload(s) of the generated IP packet(s).

In alternative embodiments, the whole system may be configured as follows: In addition to the attack prevention/detection server 180 described above, each of the protected computer assets 140a to 170c may configure anti-virus software and/or web application firewall and/or a proxy, or other countermeasures in front of the protected computer asset for detecting and blocking computer attacks. The anti-virus software, the web application firewall and the proxy may be referred to as a protection alternative collectively. Once detecting that any service request includes a computer attack (the "Yes" path of step S630), the processing unit 210 of the attack prevention/detection server 180 may forward the service request to the designated protected computer asset(s) to test if the corresponding anti-virus software, the web application firewall, or the proxy, or any combinations thereof is/are configured and work(s) properly (step S640). In step S640, specifically, the processing unit 210 of the attack prevention/detection server 180 may forward the service request to one or more protected computer assets via the communications interface 260. It should be noted that, for the purpose of testing, the attack pattern encapsulated in the service request is not modified. After that, if the computer attack is detected and blocked, the corresponding anti-virus software, the web application firewall, or the proxy, or any combinations thereof replies with an error code to inform the attack prevention/detection server 180 that the protected computer asset has caught a computer attack, or ignores the service request directly to result in a timeout of the forwarded service request. If the computer attack is not detected, the attack prevention/detection server 180 steals confidential data from the protected computer, breaks the protected computer asset, or does anything damaging the protected computer asset. The processing unit 210 of the attack prevention/detection server 180 may gather the replies from the protected computer asset(s) via the communications interface 260 in a predetermined time period and generate a report to indicate whether the detected computer attack can be caught by the protection alternative of each protected computer asset. The exemplary report may be described in Table 3.

TABLE 3

| Date | Time | Attack-Type | Protected Asset | Result (Pass/Fail) |
| --- | --- | --- | --- | --- |
| Jan. 1, 2017 | 0:00 | Mail_SQL_INJ_20232444 | 192.100.20.1#110 | P |
| Jan. 1, 2017 | 0:00 | Mail_SQL_INJ_20232444 | 192.100.30.1#110 | P |
| Jan. 1, 2017 | 0:00 | Mail_SQL_INJ_20232444 | 192.100.40.1#110 | F |
| Jan. 1, 2017 | 0:00 | Mail_SQL_INJ_20232444 | 192.100.50.1#110 | P |
| Jan. 1, 2017 | 0:00 | Mail_SQL_INJ_20232444 | 192.100.60.1#110 | P |

The exemplary report shows that the protection alternative run for the POP3 server "192.100.40.1 #110" did not catch the SQL injection attack numbered 20232444 in a testing performed at 0:00 on Jan. 1, 2017. Subsequently, an operator may fix the detected problem occurred in the failed computer asset or examine the affected scope of the failed computer asset, which is caused by the computer attack. In certain cases, one or more protected computer assets may not be protected by any protection alternative and be exposure to the risks of computer attacks. Once the protected computer asset performs a operation in response to the service request including the computer attack, some functionalities may be damaged unexpectedly. The attack prevention/detection server 180 may forward the service request to the protected computer assets with no protection to facilitate an examination of the damaged scope.

Although the embodiment has been described as having specific elements in FIG. 2, it should be noted that additional elements may be included to achieve better performance without departing from the spirit of the invention. While the process flows described in FIGS. 3 and 6 include a number of operations that appear to occur in a specific order, it should be apparent that these processes can include more or fewer operations, which can be executed serially or in parallel (e.g., using parallel processors or a multi-threading environment).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for preventing or detecting computer attacks in a cloud-based environment, performed by a processing unit of an apparatus, comprising:
  receiving a first IP (Internet Protocol) packet from a client system through Internet;
  acquiring a service request from the first IP packet, which requests service to a protected computer asset;
  determining whether the service request comprises a computer attack; and performing an attack prevention/detection operation from damaging the protected computer asset when the service request comprises the computer attack,
wherein the method further comprises:
obtaining an IP address of the protected computer asset when the service request contains no computer attack; and
generating and transmitting a second IP packet, which carries the service request, to the protected computer asset through the Internet, wherein a source address of the second IP packet is an IP address of the apparatus and a destination address of the second IP packet is the IP address of the protected computer asset, wherein a packet header or payload of the second IP packet comprises the IP address of the client system.

2. The method of claim 1, wherein the IP address of the protected computer asset is read from a storage device of the apparatus.

3. The method of claim 1, wherein the step for obtaining an IP address of the protected computer asset when the service request contains no computer attack comprises:
searching a table of a storage device of the apparatus to obtain the IP address of the protected computer asset according to a request type of the first IP packet, wherein the table stores a plurality of request types and each request type maps to one IP address.

4. The method of claim 3, wherein the request type of the first IP packet is indicated by a destination port number, a source port number or a source IP address of the first IP packet.

5. The method of claim 1, comprising: receiving a third IP packet carrying a response from the protected computer asset, wherein a packet header or payload comprises the IP address of the client system; and generating and transmitting a fourth IP packet, which carries the response, to the client system through the Internet, wherein a source address of the fourth IF packet is the IP address of the apparatus and a destination address of the fourth IP packet is the IP address of the client system.

6. The method of claim 5, wherein the fourth IP packet is generated by removing the IP address of the client system from the packet header or payload of the third IP packet, replacing a source address of the third IP packet with the IP address of the apparatus and replacing a destination address of the third IP packet with the IP address of the client system.

7. The method of claim 1, wherein the step for determining whether the service request comprises a computer attack comprises:
determining that the service request contains no computer attack when discovering a white-list pattern from the service request in a phase-one filtering; and
performing a phase-two filtering subsequent to a completion of the phase-one filtering.

8. The method of claim 7, wherein the step for determining whether the service request comprises a computer attack comprises:
providing a plurality of black-list patterns; and
determining that the service request comprises a computer attack when discovering that the service request comprises no white-list pattern but at least one black-list pattern in the phase-one filtering.

9. The method of claim 8, wherein the step for determining whether the service request comprises a computer attack comprises:
providing a plurality of custom-rule patterns; and
determining that the service request comprises a computer attack when discovering that the service request comprises no white-list pattern but at least one custom-rule pattern in the phase-one filtering.

10. The method of claim 9, wherein the step for performing a phase-two filtering further comprises:
providing a plurality of base-rule patterns; and
performing the attack prevention/detection operation when discovering that the service request comprises at least one base-rule pattern.

11. The method of claim 10, wherein the base-rule patterns cover more types of protected computer assets than the custom-rule patterns.

12. The method of claim 11, wherein the custom-rule patterns are specifically designed for an individual system or vulnerability and the base-rule patterns are designed to prevent common attacks.

13. The method of claim 1, wherein the service request comprises a layer 7 message.

14. The method of claim 1, wherein the attack prevention/detection operation is performed to replace special characters to prevent strings from switching into any execution context, and forward the modified service request to the protected computer asset.

15. The method of claim 1, wherein the attack prevention/detection operation is performed to drop the service request, without forwarding the service request to the protected computer asset.

16. The method of claim 1, wherein the attack prevention/detection operation is performed to block the service request from being forwarded to the protected computer asset and respond with a message to the client system.

17. The method of claim 1, wherein the attack prevention/detection operation is performed to forward the service request to the protected computer asset and record a log describing a detection time with the discovered custom-rule pattern or the discovered base-rule pattern.

18. The method of claim 1, wherein the attack prevention/detection operation is performed to respond to the client system with an url (uniform resource locator) linking to a warning web page.

19. The method of claim 1, wherein the attack prevention/detection operation is performed to forward the service request to a destination site of a sandbox.

20. The method of claim 1, wherein the attack prevention/detection operation is performed to forward the service request to one or more protected computer assets to test if a protection alternative run on each protected computer asset receiving the service request can detect the computer attack.

21. The method of claim 1, wherein the attack prevention/detection operation is performed to forward the service request to one or more protected computer assets with no protection to facilitate an examination of damaged scope.

22. An apparatus for preventing or detecting computer attacks in a cloud-based environment, comprising:
a communications interface; and
a processing unit, coupled to the communications interface, receiving a first IP (Internet Protocol) packet from a client system through the Internet via the communications interface; acquiring a service request from the first IP packet, which requests service to a protected computer asset; determining whether the service request comprises a computer attack; and performing an attack prevention/detection operation from damaging the protected computer asset when the service request comprises the computer attack,
wherein the processing unit obtains an IP address of the protected computer asset when the service request contains no computer attack; and generates and transmits a second IP packet, which carries the service request, to the protected computer asset through the Internet via the communications interface, wherein a source address of the second IP packet is an IP address of the apparatus and a destination address of the second IP packet is the IP address of the protected computer asset; and wherein a packet header or payload of the second IP packet comprises the IP address of the client system.

23. The apparatus of claim 22, comprising:
a storage device, storing an IP address of the protected computer asset,
wherein the processing unit reads the IP address of the protected computer asset from the storage device.

24. The apparatus of claim 22, comprising:
a storage device, storing a table, wherein the table stores a plurality of request types and each request type maps to one IP address,
wherein the processing unit searches the table to obtain the IP address of the protected computer asset according to a request type of the first IP packet.

25. The apparatus of claim 23, wherein the request type of the first IP packet is indicated by a destination port number, a source port number or a source IP address of the first IP packet.

26. The apparatus of claim 22, wherein the processing unit receives a third IP packet carrying a response from the protected computer asset, wherein a packet header or payload comprises the IP address of the client system; and generates and transmits a fourth IP packet, which carries the response, to the client system through the Internet, wherein a source address of the fourth IP packet is the IP address of the apparatus and a destination address of the fourth IP packet is the IP address of the client system.

27. The apparatus of claim 26, wherein the fourth IP packet is generated by removing the IP address of the client system from the packet header or payload of the third IP packet, replacing a source address of the third IP packet with the IP address of the apparatus and replacing a destination address of the third IP packet with the IP address of the client system.

28. The apparatus of claim 22, wherein the processing unit comprises a dedicated electronic circuit or a general-purpose processor programmed using microcode or software instructions to perform the recited functions.

* * * * *